(12) United States Patent
Van Asma et al.

(10) Patent No.: US 6,600,514 B1
(45) Date of Patent: Jul. 29, 2003

(54) DIGITAL VIDEO-PROCESSING UNIT

(75) Inventors: Cornelis G. M. Van Asma, Eindhoven (NL); Matheus J. G. Lammers, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 477 days.

(21) Appl. No.: 09/610,598

(22) Filed: Jul. 5, 2000

(30) Foreign Application Priority Data

Jul. 7, 1999 (EP) .............................................. 99202227

(51) Int. Cl.$^7$ .............................. H04N 11/20; H04N 7/01
(52) U.S. Cl. ........................ 348/458; 348/581; 345/667
(58) Field of Search .................................. 348/441, 576, 348/577, 561, 562, 721, 771, 445, 458, 581, 582, 792; 345/472, 472.1, 472.2, 670, 671, 668, 667; 382/298; H04N 11/20, 7/01

(56) References Cited

U.S. PATENT DOCUMENTS

| 4,471,381 A | * | 9/1984 | Kasuga et al. ............... 348/458 |
| 5,172,103 A | * | 12/1992 | Kita ........................... 345/667 |
| 5,587,742 A | | 12/1996 | Hau et al. .................... 348/441 |

* cited by examiner

*Primary Examiner*—Michael H. Lee

(57) ABSTRACT

In a video-processing unit comprising a processing means, memory means and a memory manager, the processing means comprises an N-tap digital filter for performing scaling operations on a sampled image present in the memory means. The N-tap digital filter further comprises a predetermined first number of line memories. Each line memory is arranged to contain a predetermined second number of samples of selected lines of the sampled image in the memory means. The second number of samples is smaller than the total number of samples of each line of the sampled image.

12 Claims, 3 Drawing Sheets

DIGITAL VIDEO-PROCESSING UNIT

FIELD OF THE INVENTION

Figure 1:
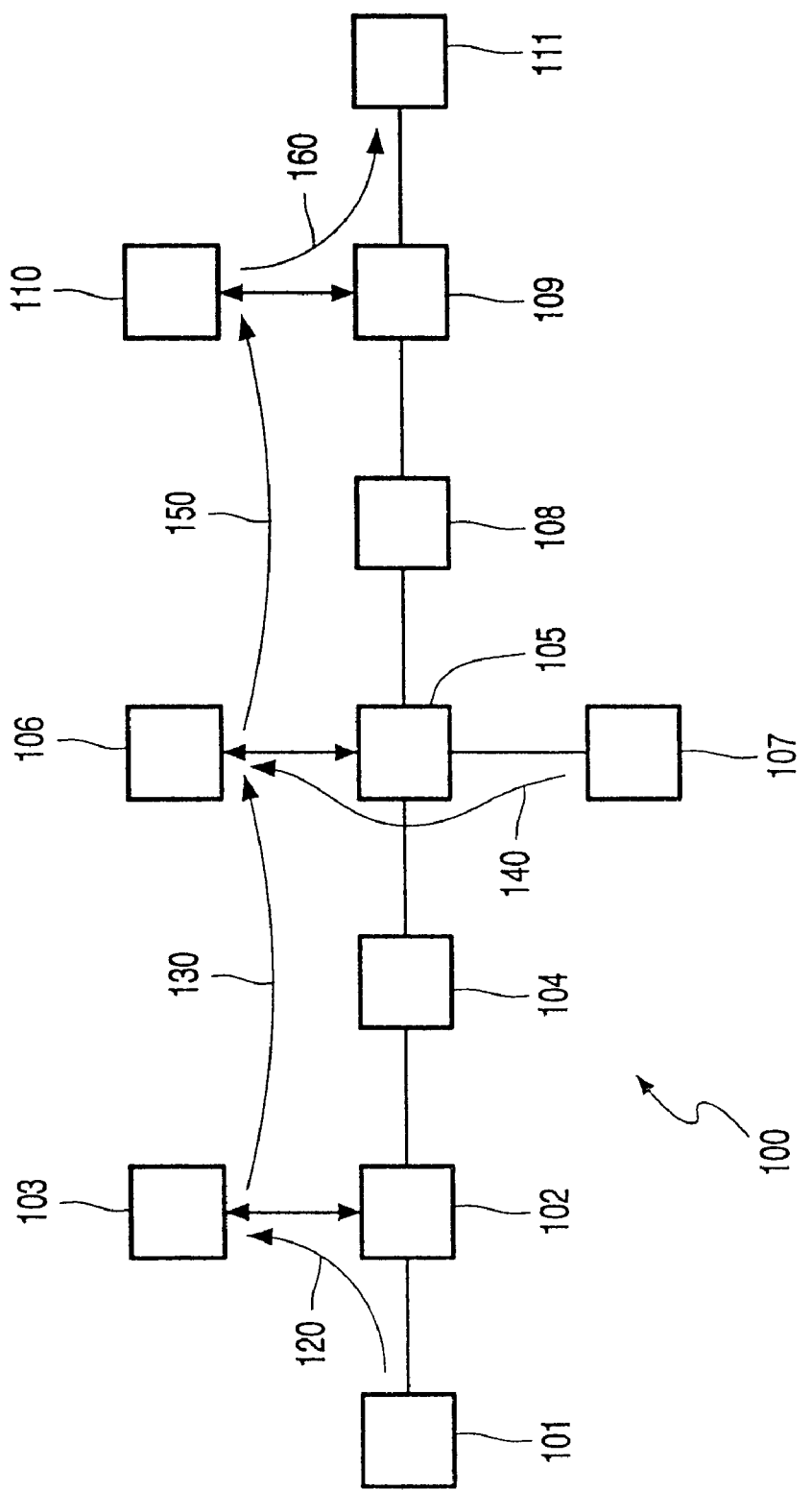

The invention relates to a digital video-processing unit for processing an input data signal to an output data signal for an output device, the input data signal representing a sampled image comprising a number of lines, said video-processing unit comprising first memory means for storing the input data signal, processing means for processing the stored input data signal to an output data signal, second memory means for storing the output data signal prior to supply to the output device, a memory manager being coupled to first and second memory means and the processing means being arranged to transfer the input data signals to the first memory means, to transfer the stored input data signal to the processing means, to transfer output data to the second memory means and to provide the stored processed data to the output device.

The invention further relates to a video display system.

BACKGROUND OF THE INVENTION

Such a video-processing system and display system generally use spatial light modulators such as a liquid crystal display or a digital micro-mirrored device (DMD). These spatial light modulators comprise a number of pixels arranged in a rectangular matrix. This matrix comprises a number of rows and columns. Each row comprises an equal number of pixels. In general, the number of rows does not match with the number of rows of the input data signal to be displayed, or the aspect ratio of the image represented by the input data signal does not match with the aspect ratio of the spatial light modulator. Therefore, the processing means resizes the input data in such a way that the number of rows of the resized output data matches the number of rows of the matrix, or the aspect ratio of the image of the resized data output signal matches the aspect ratio of the matrix. During video processing, the resizing operation can be performed, for example, by a separable N-tap two-dimensional filter, where N>2. Such a filter operation can be performed as a cascade of two N-tap one-dimensional filters, namely a first one-dimensional filter for a first, horizontal direction and a second one-dimensional filter for a second, vertical direction. For a high-speed operation of the N-tap one-dimensional filter in the vertical direction, information corresponding to N lines of the image is required. An obvious solution is the application of line memories inside the processing means. When no line memories are used in the processing means, the required bandwidth to the first frame buffer increases by a factor N. When the processing means comprises N line memories for storing the N adjacent lines of input data, the samples of the output data signal are generated from a weighted sum of the samples present in the line memories. A disadvantage of the known video processing unit is that the N line memories require many logic gates in the digital video processing unit.

SUMMARY OF THE INVENTION

It is, inter alia, an object of the invention to provide a video-processing unit with an economic architecture capable of handling resizing input data. To this end, a video-processing unit according to the invention is characterized in that the processing means is arranged to process of a data set comprising a first set of samples corresponding to a block of the sampled image, the first set of samples being composed of a predetermined first number of samples selected from each one of a predetermined second number of lines of the sampled image, the first number of selected samples of each line being smaller than the total number of samples of a line. By using a first number of samples in the blocksize which is lower than the total number of samples of one line, the size of memory means in the processing unit can thus be reduced. Furthermore, this reduction of memories in the processing means allows an economic architecture of the video-processing unit having a reduced number of gates. Further advantageous embodiments of the invention are defined in the dependent claims.

A particular embodiment of the video processing unit according to the invention is characterized in that the memory manager is arranged to provide a third number of said data sets to the processing means, which third number depends on the total number of samples of the single line, the first number of selected samples, the total number of lines of the image and the second number of lines. The third number may be equal to the product of the total number of samples of the single line divided by the first number of selected samples and the total number of lines of the image divided by the second number of adjacent lines. In this way, the memory manager ensures that the complete image present in the first memory means is processed.

A further embodiment of the video-processing unit according to the invention is characterized in that the predetermined second number is smaller than or equal to half the total number of lines of the sampled image. When the number of blocks in a vertical direction of the sampled image is two or more, motion artefacts can be eliminated, because the number of blocks in a horizontal direction of the sampled image is processed. The processed lines of the blocks can be displayed.

A further embodiment of the video-processing unit according to the invention is characterized in that the processing means comprises an N-tap two-dimensional digital filter, wherein N is equal to or larger than 2. An example of such a digital filter is a separable N-tap two-dimensional digital filter.

A further embodiment of the video-processing unit according to the invention is characterized in that the video-processing unit comprises N line memory means, each of which is arranged to store the number of selected samples of one of N selected lines, wherein N is equal to or larger than 2.

A further embodiment of the video processing unit according to the invention is characterized in that the data set further comprises a second set of samples composed from a neighborhood of the block of the image. Run-in artefacts due to the block boundaries in the sampled image are thus reduced.

A further embodiment of the video-processing unit according to the invention is characterized in that the neighborhood extends in a first dimension of the sampled image to a first sampling distance corresponding to a first run-in time of the N-tap two-dimensional digital filter in the first dimension, and the neighborhood extends in a second dimension of the sampled image to a second sampling distance corresponding to a second run-in time of the N-tap two-dimensional digital filter in the second dimension. In this way, run-in artefacts due to the block boundaries can be avoided.

The invention further relates to a video display system. It is an object of the invention to provide a video display system with an economic architecture capable of handling resizing input data. To this end, a video display system according to the invention is characterized in that the video display system comprises a digital video-processing unit as described hereinbefore, wherein the output comprises a display unit which is coupled to the output of said digital video-processing unit for displaying the output data signal.

BRIEF DESCRIPTION OF TBE DRAWINGS

Figure 2:
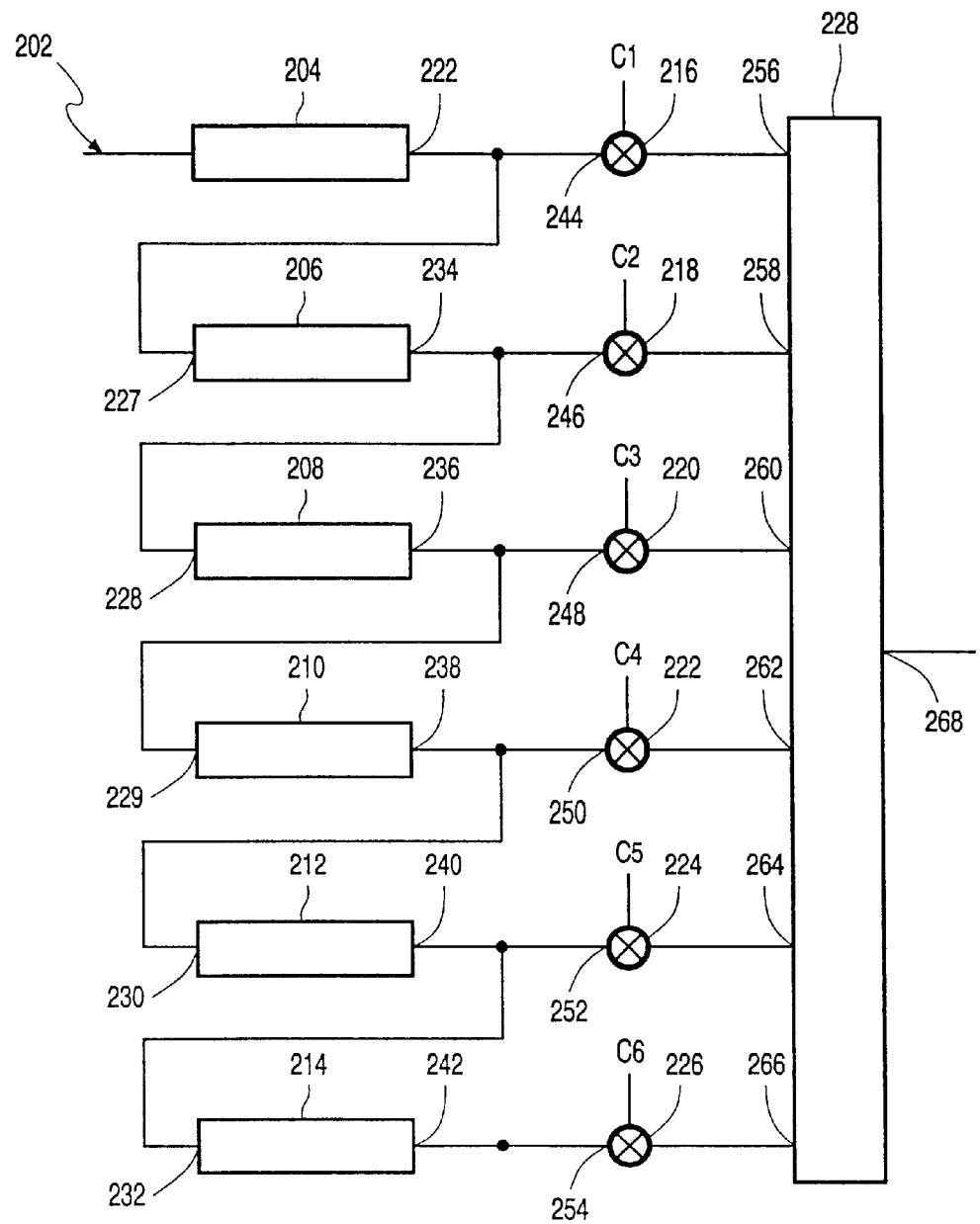
Figure 3:
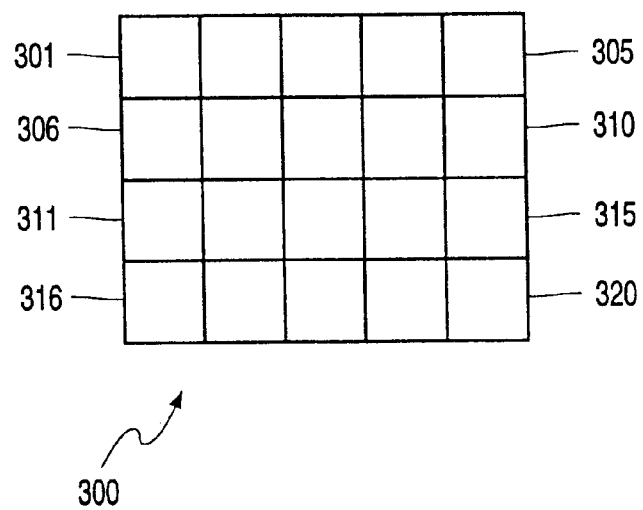
Figure 4:
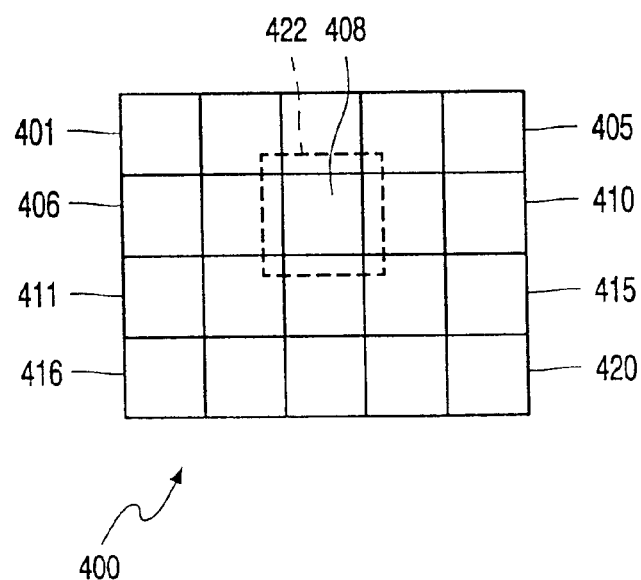

These and other aspects of the invention will be further explained with reference to the accompanying drawings in which FIG. 1 shows a block diagram of a video display system, FIG. 2 shows a block diagram of a 6-tap digital filter, FIG. 3 shows a block partition of the sampled image and FIG. 4 shows an example of a neighborhood of a block of the sampled image.

DETAILED DESCRIIPTION OF PREFERRED EMBODIMENTS

FIG. 1 shows a block diagram of a video display system 100 in which the scaling operation is elucidated, which may be performed by the video-processing unit in accordance with the invention. One of the functions of the display system comprises a resizing operation, i.e. matching the number of actual lines within a picture frame with the number of lines and the number of columns of the display panel. The display panel may consist of a fixed number of columns and lines. Examples of such a matrix display are light valve projection displays such as an LCD projection display, or a digital micro-mirrored device (DMD) projection display, plasma-addressed liquid crystal displays (PALC) or plasma display panels (PDP). A second function of the display system may be a geometric keystone correction. Other functions of the display system may be bit-mapped on-screen display, conversion of a video data signal into a color-sequential output for DMD or reflective LCD and conversion of an output data signal into a sub-field modulation for plasma displays, PALC displays or DMDS.

The block diagram indicates the different processes performed by the video display system. The block diagram shows a first RGB source 101, first memory means, for example a first frame buffer 103, a first memory manager, for example a first frame buffer controller 102 and a first scaling unit 104. The first R,G,B source 101 provides digital video signals in which, for example 8 bits per color are used. The first frame buffer controller 102 is coupled via, for example, a bidirectional port to the first frame buffer 103. An output of the first frame buffer controller 102 is coupled to the processing means, for example a first scaling unit 104. The scaling unit 104 may be a dedicated digital filter for scaling the image so that the scaled image matches the actual display resolution. The display resolution of the digital video signal may not always match the resolution and/or aspect ratio of the display unit. The scaling unit 104 upscales or downscales the input signal to fit the display resolution in one or both dimensions. Horizontal scaling alters the number of pixels per line. Vertical scaling alters the number of actual lines per frame. Scaling algorithms are known in the art of image processing and make use of interpolation or finite impulse response (FIR) filtering. Furthermore, the block diagram of the display system 100 shows a second memory manager, for example a second frame buffer controller 105 and a second memory, for example a second frame buffer 106 and a second RGB source, for example a second VCR or an On Screen Display source (OSD) 107 and a second scaling unit 108. An output of the first scaling unit 104 is coupled to the second frame buffer controller 105. The OSD source 107 is coupled to a second input of the second frame buffer controller 105. The second frame buffer controller 105 is coupled via, for example, a bidirectional port to the second frame buffer 106. An output of the second frame buffer controller 105 is coupled to the second scaling unit 108. Furthermore, the block diagram of the display system 100 shows a third memory manager 109, for example a third frame buffer controller 109, a third memory, for example a third frame buffer 110 and a display unit, for example, an LCD monitor 111. An output of the second scaling unit 108 is coupled to the third frame buffer controller 109. The third frame buffer controller 109 is coupled via, for example, a bidirectional port to the third frame buffer 110. An output of the third frame buffer controller 109 is coupled to the LCD-monitor 111. The LCD monitor 111 may comprise D/A converters for each color channel so as to convert the digital data into analog data, and an LCD projection engine having separate R,G,B channels which are optically combined to one image which is enlarged and projected on a screen by an optical system. Each channel is provided with an LCD light valve which comprises an array of a fixed number of pixels, for example, 800×600.

The architecture indicated by the block diagram representation of the display system 100 performs the following processes, which are indicated as arrows in FIG. 1.

I. An incoming video data stream is stored in the first frame buffer 103 by the first frame buffer controller 102, indicated as a first arrow 120.

II. The stored video data stream is read from the first frame buffer 103 and resized by the first scaling unit 104, and the resized video date stream is stored in the second frame buffer 106, indicated as a second arrow 130.

III. The OSD data is stored in the second frame buffer 106 using an overlay technique. In the overlay technique, an additional bit indicates whether the incoming OSD data overwrites a specific location in the second frame buffer 106, indicated as a third arrow 140.

IV. The resized video data stream is read from the second frame buffer 106 and corrected by the second scaling unit 108 and stored in the third frame buffer 110, indicated as a fourth arrow 150.

V. The corrected video data stream is read from the third frame buffer 110 and sent to the output device or display device 111, indicated as a fifth arrow 160.

To perform the scaling operations, the first scaling unit 104 or the second scaling unit 108 comprises, for example, a two-dimensional digital filter. Preferably, this two-dimensional digital filter comprises a separable N-tap two-dimensional filter. This separable two-dimensional filter can be implemented as a cascade of 2 N-tap one-dimensional filters, namely one N-tap digital filter for a first, horizontal direction and one for a second, vertical direction of the sampled image. The N-tap digital filter for the vertical direction is explained with reference to FIG. 2.

FIG. 2 shows an example of a scaling unit comprising a conventional 6-tap digital filter consisting of 6 memory means 204,206,208,210,212,214 for storing of 32 preferably adjacent samples of 6 preferably adjacent lines of the sampled image, 6 coefficient multipliers 216,218,220,222, 224,226 and an adder 228 for vertical scaling of a sampled image. The memory means 204,206,208,210,212,214 comprise, for example line memories 204,206,208,210,212,

214 having inputs 202,227,228,229,230,232 and outputs 222,234,236,238,240,242. The 6 line memories 204,206, 208,210,212,214 are concatenated in such a way that the outputs 222,234,236,238,240,242 of the first line memories 204,206,208,210,212 are electrically connected to the inputs 227,228,229,230,232 of the second line memories 206,208, 210,212,214. The outputs 222, 234,236,238,240,242 of the line memories 204,206,208,210,212,214 are electrically connected to the inputs 244,246,248,250,252,254 of the coefficient multipliers 216,218,220,222,224,226, respectively. The outputs of the coefficient multipliers 216,218, 220,222,224,226 are electrically connected to the inputs 256,258,260,262,264,266 of the adder 228. In operation, when each of the line memories 204,206,208,210,212,214 is filled with 32 samples of 6 consecutive lines of the sampled image, the coefficient multipliers 216,218,220,222,224,226 multiply the sample values present at the outputs 222, 234,236,238,240,242 of the line memories by predetermined coefficients c1 . . . c6. A person skilled in the art of digital video filters can determine the coefficients c1 . . . c6 of a 6-tap digital filter, for example a polyphase digital filter, in a conventional way from the number of lines of the image to be scaled and the number of lines of the resulting image, dependent on the required scaling operation. The adder 228 sums the results provided by the coefficient multipliers 216,218,220,222,224,226, and the sum, representing the scaled sample, is stored in the second frame memory 106. As a last step, all the samples are shifted one position to the right in the line memories 204,206,208,210,212,214, whereby the sample value of a last position of a first line memory 204,206,208,210,212 is transported to a first position of the second line memory 206,208,210,212,214. The described process is repeated until all the samples in the line memories 204,206,208,210,212,214, are processed.

In general, the number of samples stored in one line memory 204,206,208,210,212,214 equals the number of samples of one line of the sampled image. According to the invention, the first scaling unit 104 is arranged to process data sets, comprising a first set of samples, corresponding to a preferably square block of the sampled image. The first set of samples is composed of samples of preferably adjacent lines of the sampled image, and the number of selected adjacent samples of each line is smaller than the total number of samples of a line. For example, when a XVGA sampled image is stored in the first frame memory and has to be scaled to, for example, an SVGA image, the number of samples of one line amounts to 1024 and the number of lines amounts to 768. The numbers of adjacent samples of one line may be chosen to be 32. The length of the line memories is thus reduced to 32 samples. In practice, a number of 6 line memories is optimal for digital filtering with an acceptable image performance. Additionally, the processing means may also comprise a conventional 6-tap digital filter for horizontal scaling (not shown). The block processing in accordance with the invention reduces the length of the line memories substantially, and thus the number of gates of the digital design. Consequently, the area of the integrated circuit comprising the video-processing unit can be reduced accordingly.

Furthermore, the memory manager is arranged to provide a third number of data sets to the processing unit 104, which third number equals Nhtotal/Nhblock×Nvtotal/Nvblock, wherein Nhtotal represents the total number of samples of a line of the sampled image, Nhblock represents the number of adjacent samples selected from one line of the sampled image, Nvtotal represents the number of lines of the sampled image and Nvblock represents the number of adjacent lines in each block of the sampled image.

Preferably, the number of adjacent lines Nvblock is smaller than or equal to half the total number of lines of the sampled image so as to avoid motion artefacts. When the sampled image in the first frame memories comprises an XGA image, then Nhtotal=1024, Nhblock=16, Nvtotal=768

Nvblock 16.

The number of blocks is then 256. The number of pixels in a single block is 64×48=3072.

An example of block partitioning of a sampled image is shown in FIG. 3.

FIG. 3 shows, for the sake of simplicity, a sampled image comprising 20 blocks arranged in a 4×5 matrix. In order to reduce run-in artefacts due to the block boundaries of the two-dimensional 6-tap digital filter in the scaled image, the data set further comprises a second set of samples composed from a neighborhood of the blocks of the image. An example of such a 6-tap digital filter may be a conventional 6-tap polyphase filter design. The neighborhood extends in a first dimension, the horizontal dimension of the sampled image, to a first sampling distance corresponding to 6 pixels. The multiplication of the number of samples times the sample period substantially equals a first run-in time of the 6-tap digital filter in the horizontal direction of the image. The neighbourhood extends in a second dimension, the vertical dimension of the sampled image, to a second sampling distance corresponding to 6 lines. The multiplication of the number of lines times the line period equals a second run-in time of the 6-tap digital filter in a vertical direction. An example of a neighborhood corresponding to one block of the sampled image is shown in FIG. 4.

FIG. 4 shows, again for the sake of simplicity, an arrangement of 20 blocks 1–20 arranged in a 4×5 matrix, in which the borders of the blocks are drawn by way of the solid lines. An example of a neighborhood is drawn around a first block 408 as a broken line 422. When a 6-tap digital filter is applied, the neighborhood 422 may extend over a sampling distance of 6 samples beyond each side of the first block 408. The overhead of transfer of the additional samples of the neighborhood 422 requires a slightly larger bandwidth of the first frame memory 103. However, as long as the block size is large with respect to the neighborhood, the overhead is negligible. When this run-in compensation is applied, the line memories 24,26,28,30 comprise a number of samples which equals the number of samples in a horizontal dimension of one block plus twice the number of samples of the neighborhood in that dimension. So, in this case, this number is 6+64+6=76. The line memories 24,26,28,30 together with the coefficient multipliers 32,34,36,38, the adder 40 and the memory manager 102 can be integrated on a single substrate, using a conventional CMOS process. Furthermore, the first and second frame memories 103,106 can be integrated in one and the same physical memory.

Furthermore, a second scaling unit 108 may have an equivalent structure and block processing as the first scaling unit 104.

It should be noted that the above-mentioned embodiments illustrate rather than limit the invention, and that those skilled in the art will be able to design many alternative solutions without departing from the scope of the claims. In the claims enumerating several means, several of these means can be embodied by one and the same item of hardware. The invention is preferably applied in LCD projectors and other matrix displays (digital micro-mirrored device, plasma display panel, PALC displays etc.) but can also be applied with other devices.

What is claimed is:

1. A digital video-processing unit for processing an input data signal to an output data signal for an output device, the input data signal representing a sampled image comprising a number of lines, said video-processing unit comprising
    first memory means for storing the input data signal,
    processing means for processing the stored input data signal to an output data signal,
    second memory means for storing the output data signal prior to supply to the output device,
    a memory manager being coupled to the first and second memory means and to the processing means and being arranged to transfer the input data signal to the first memory means, to transfer the stored input data signal to the processing means, to transfer the output data signal to the second memory means and to provide the stored output data signal to the output device,
    characterized in that the processing means is arranged to process a data set comprising a first set of samples corresponding to a block of the sampled image, the first set of samples being composed of a predetermined first number of samples selected from each one of a predetermined second number of lines of the sampled image, the first number of selected samples of each line being smaller than the total number of samples of a line.

2. A digital video-processing unit as claimed in claim 1, wherein the memory manager is arranged to provide a third number of data sets to the processing means, which third number depends on the total number of samples of the single line, the first number of selected samples, the total number of lines of the sampled image and the second number of lines.

3. A digital video-processing unit as claimed in claim 1, wherein the predetermined second number is smaller than or equal to half the total number of lines of the sampled image.

4. A digital video-processing unit as claimed in claim 1, wherein the processing means comprises an N-tap two-dimensional digital filter, wherein N is equal to or larger than 2.

5. A digital video-processing unit as claimed in claim 1, wherein the processing means comprises a separable N-tap two-dimensional digital filter, wherein N is equal to or larger than 2.

6. A digital video-processing unit as claimed in claim 1, wherein the processing means comprises N line memory means, each of which is arranged to store the number of selected samples of one of N selected lines, wherein N is equal to or larger than 2.

7. A digital video-processing unit as claimed in claim 5, wherein said processing means, said memory manager and the N line memory means are provided on a single integrated circuit.

8. A digital video-processing unit as claimed in claim 5, wherein the data set further comprises a second set of samples composed from a neighborhood of the block of the image.

9. A digital video-processing unit as claimed in claim 8, wherein the neighborhood extends in a first dimension of the sampled image to a first sampling distance corresponding to a first run-in time of the N-tap two-dimensional digital filter in the first dimension, and the neighborhood extends in a second dimension of the sampled image to a second sampling distance corresponding to a second run-in time of the N-tap two-dimensional digital filter in the second dimension.

10. A video display system comprising a digital video-processing unit as claimed in claim 1, wherein the output device comprises a display unit which is coupled to the output of said digital video-processing unit for displaying said output data signal.

11. A digital video-processing unit for processing an input video signal for an output device, the input video signal representing a sampled image comprising a number of lines, said video-processing unit comprising:
    a first memory for storing the input data signal,
    a scaling system for scaling the stored input data signal to a scaled output data signal,
    a second memory for storing the scaled output data signal prior to outputting to the output device,
    a memory manager coupled to the first and second memory and to the scaling system and being arranged to transfer the input data signal to the first memory, to transfer the stored input data signal to the scaling system, to transfer the scaled output data signal to the second memory and to provide the scaled output data signal to the output device,
    wherein the scaling system is arranged to process a data set comprising a first set of samples corresponding to a block of the sampled image, the first set of samples being composed of a predetermined first number of samples selected from each one of a predetermined second number of lines of the sampled image, the first number of selected samples of each line being smaller than the total number of samples of a line.

12. The digital video-processing unit of claim 11, wherein the data set further comprises a second set of samples composed from a neighborhood of the block of the image, and wherein the neighborhood extends in a first dimension of the sampled image to a first sampling distance corresponding to a first run-in time of an N-tap two-dimensional digital filter in the first dimension, and the neighborhood extends in a second dimension of the sampled image to a second sampling distance corresponding to a second run-in time of the N-tap two-dimensional digital filter in the second dimension.

* * * * *